United States Patent [19]

Jordan

[11] Patent Number: 4,563,586
[45] Date of Patent: Jan. 7, 1986

[54] PORTABLE IONIZATION CHAMBER AND ALIGNMENT APPARATUS

[76] Inventor: John A. Jordan, 2512 McArthur St., Tallahassee, Fla. 32304

[21] Appl. No.: 587,760

[22] Filed: Mar. 9, 1984

[51] Int. Cl.⁴ .............................................. G01T 1/185
[52] U.S. Cl. ...................................... 250/374; 378/97; 378/189
[58] Field of Search ................ 378/97, 189, 177, 182, 378/96, 181, 204; 250/374, 354.1, 370

[56] References Cited

U.S. PATENT DOCUMENTS

| | | | |
|---|---|---|---|
| 2,790,907 | 4/1957 | Graves | 378/177 |
| 3,370,822 | 2/1968 | Miller | 378/181 |
| 3,705,984 | 12/1972 | Westenberger | 378/181 |
| 3,967,128 | 6/1976 | Smulewicz | 378/180 |
| 3,968,374 | 7/1976 | Schroeder | 378/181 |
| 3,995,161 | 11/1976 | Lux | 378/97 |
| 4,045,678 | 8/1977 | Rickard | 378/180 |
| 4,060,733 | 11/1977 | Franke et al. | 378/97 |
| 4,230,944 | 10/1980 | Wiegman et al. | 378/97 |
| 4,300,053 | 11/1981 | Guynes | 378/181 |
| 4,427,946 | 1/1984 | Chattin | 378/97 |

Primary Examiner—Alfred E. Smith
Assistant Examiner—Carolyn E. Fields
Attorney, Agent, or Firm—Dowell & Dowell

[57] ABSTRACT

A combination portable ionization chamber and support for mounting and adjustably aligning the chamber to an X-ray cassette so that the ionization chamber is accurately positioned in line with a source of radiation and a body part or object being X-rayed wherein the support is suspended from the X-ray cassette and retains the ionization chamber in position abutting the rear surface of the X-ray cassette so that when sufficient radiation has been detected by the ionization chamber to insure an acceptable radiograph, power to the radiation source will be automatically terminated.

3 Claims, 4 Drawing Figures

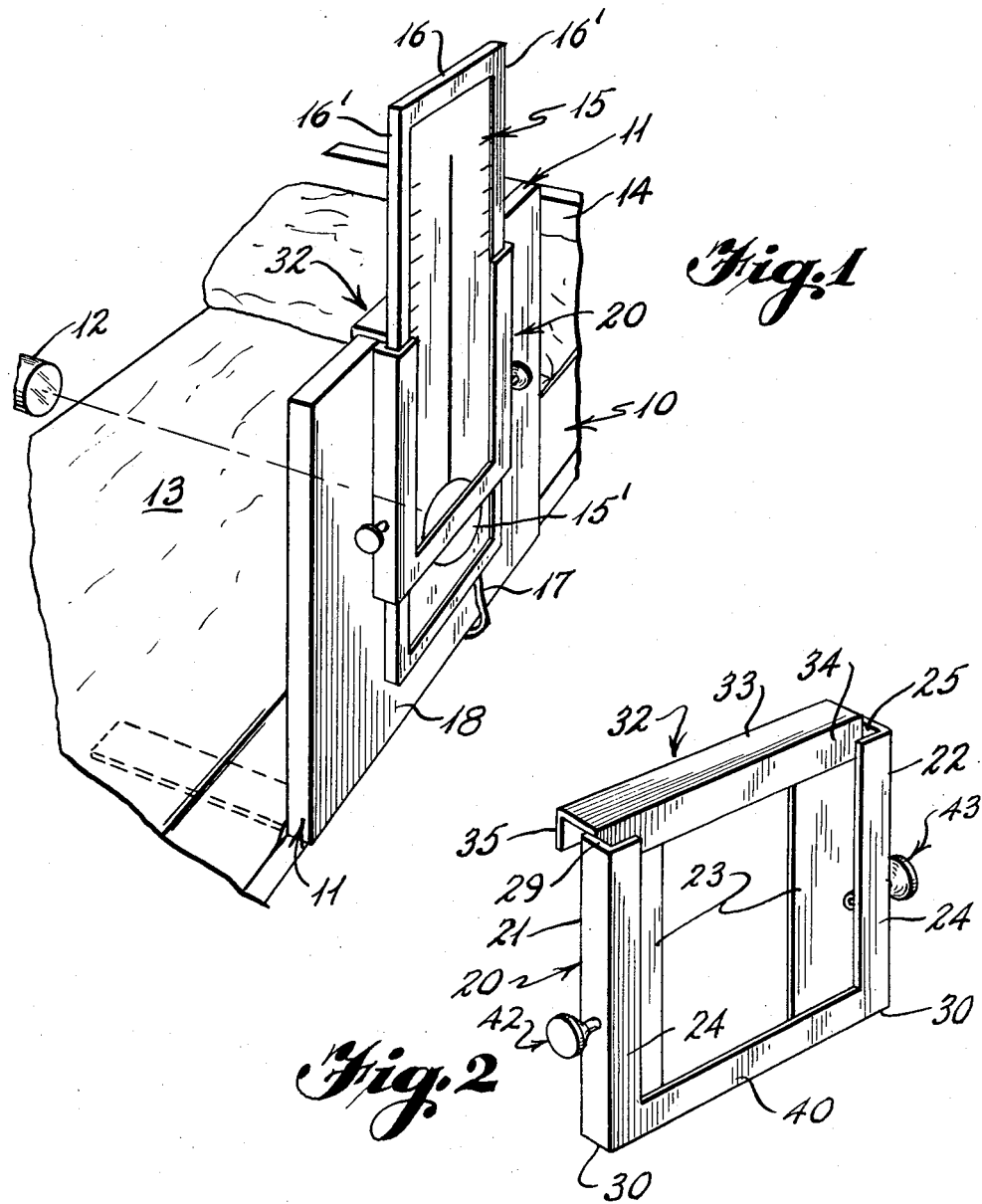

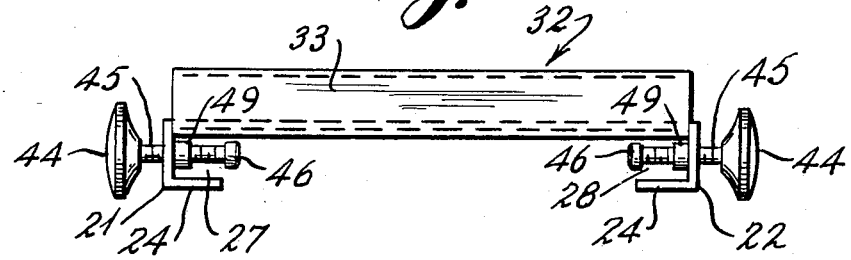
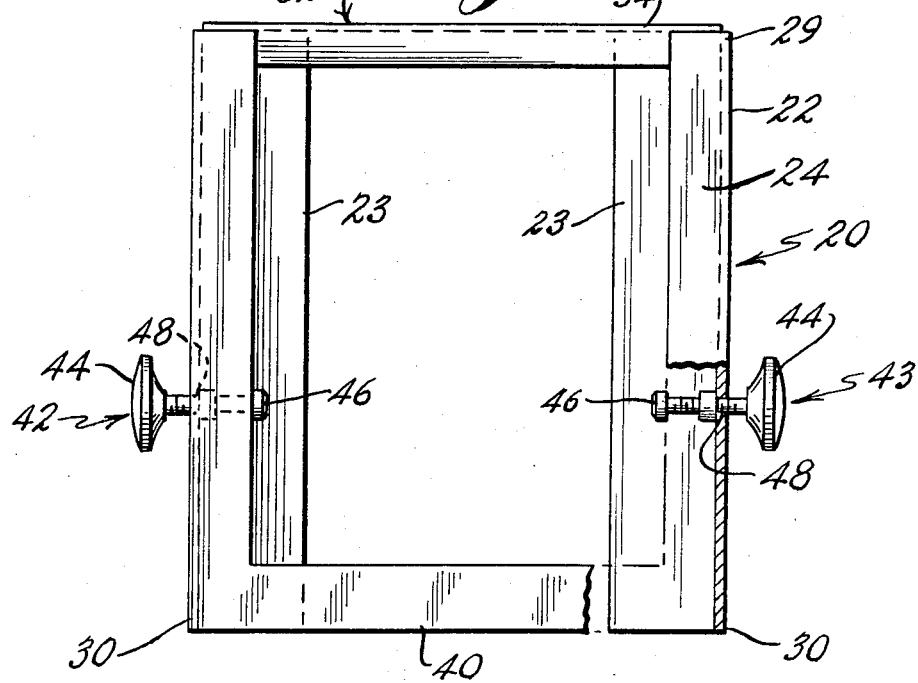

PORTABLE IONIZATION CHAMBER AND ALIGNMENT APPARATUS

BACKGROUND OF THE INVENTION

History of the Prior Art

The use of hospital and other portable X-ray equipment has long presented technicians with problems in obtaining proper radiographs or exposures of anatomical parts or other objects being X-rayed. Proper exposure or filming not only requires that the X-ray machine or source and the cassettes are properly aligned so as to receive the desired anatomical exposure but that sufficient radiation has passed through the object being X-rayed and been received by the cassettes to insure a good radiograph. In the past, numerous portable cassette holders have been designed and developed in order to permit a relative adjustment to be made between the cassette and the X-ray source.

One example of prior art X-ray cassette holders is disclosed in U.S. Pat. No. 3,705,984 to J. M. Westenberger. In this disclosure, the cassette holder functions both as a guide to permit relative vertical adjustment of the film cassette and as a support or backrest for the patient being X-rayed. Other examples of prior art X-ray cassette holders include U.S. Pat. Nos. 3,968,374 to Schroeder; 4,300,053 to Gaynes; and 3,967,128 to Smulewicz.

None of the foregoing patents, however, are concerned with insuring that a proper amount of radiation has been received by the X-ray cassettes and these do not disclose or suggest means for properly orienting an ionization chamber relative to the cassette and X-ray source.

The present invention is directed to an ionization chamber and support therefor which are used in conjunction with X-ray cassettes and particularly to a portable ionization chamber and support bracket for adjustably mounting the chamber to an X-ray cassette so as to be aligned with the object being X-rayed, the X-ray sources and the X-ray cassette to thereby control the amount of radiation being emitted so as to obtain properly exposed radiographs.

SUMMARY OF THE INVENTION

A portable ionization chamber and bracket for adjustably mounting the chamber to an X-ray cassette in which the ionization chamber is enclosed in a generally rectilinear frame or housing which is adjustably carried within the support bracket. The support bracket includes a generally U-shaped frame defined by a pair of spaced open channel members which are connected on one side adjacent their uppermost portion by an elongated angle member which functions as a stabilized hanger bracket and which engages the upper edge of an X-ray cassette to which the ionization chamber is to be mounted. The lowermost portion of the opposed channel members are connected adjacent the other side thereof by a generally planar reinforcing bar. The frame of the ionization chamber is slidably carried within the opposed channel members and is extendable both above and below such members. A pair of adjustable fastening members are retained by the opposed channel members to selectively retain the ionization chamber in a fixed vertically adjusted position.

It is a primary object of this invention to provide a portable ionization chamber and mounting bracket assembly which permits the ionization chamber to be retained substantially flush against the backside of an X-ray cassette and wherein the ionization chamber may be both horizontally and vertically adjusted into proper alignment and thereafter retained in such alignment with an X-ray source, object being radiographed, and X-ray cassette.

It is another object of this invention to provide an ionization chamber and bracket assembly wherein the bracket permits visual alignment of the ionization chamber with respect to an X-ray source and object being radiographed while supporting the ionization chamber to the rear of an X-ray cassette to thereby orient the ionization chamber in a proper position to regulate the amount of radiation being emitted by the X-ray source in order to obtain a good radiograph of the object being X-rayed.

BRIEF DESCRIPTION OF THE DRAWINGS

FIG. 1 is a perspective view illustrating the ionization chamber and bracket as shown mounted to the rear of an X-ray cassette.

FIG. 2 is a perspective view of the ionization supporting bracket of the present invention.

FIG. 3 is a top plan view of the ionization chamber support bracket shown in FIG. 2.

FIG. 4 is a rear elevational view of the ionization chamber supporting bracket of FIG. 2 having portions broken away.

DESCRIPTION OF THE PREFERRED EMBODIMENT

With particular reference to FIG. 1, an ionization chamber assembly 10 is shown as it is mounted to the rear of an X-ray cassette 11 so as to be in alignment with an X-ray source 12. As illustrated, the X-ray cassette 11 is retained in a position with respect to a mattress 13 of a hospital bed 14 so as to enable a radiograph to be taken of selected anatomical areas of a patient supported on the mattress. In order to assure proper exposure of the X-ray cassette, the amount of radiation passing through the object being X-rayed must be accurately determined. To control the amount of radiation being passed through the subject, an ionization chamber is placed in an area behind the X-ray cassette. The ionization chamber detects the amount of radiation and functions to electrically disconnect the power source of the X-ray apparatus 12 when sufficient radiation has been detected to insure a properly exposed radiograph.

In use, it has been difficult to properly align the ionization chamber with the source of radiation, object being radiographed and the X-ray cassette with the affect that many radiographs were made with improper exposures. With the present invention an ionization chamber apparatus 15 includes an ionization chamber target 15' which is mounted within a rectilinear frame 16 so as to be spaced between the generally parallel side walls 16' thereof and which is electrically connected by means of an electrical cord 17 to the X-ray apparatus 12.

The ionization chamber 15 and its supporting frame 16 are selectively adjustably mounted so as to be retained generally flush against the rear surface 18 of the X-ray cassette 11 and properly aligned therewith by a generally U-shaped mounting bracket 20. With particular reference to FIGS. 2 through 4, the ionization chamber mounting bracket 20 includes a pair of opposed and spaced channel members 24 and 22 which are generally U-shaped in cross section. Each of the opposed channel members includes an elongated back wall member 23 which is spaced from elongated front wall member 24 by side wall member 25. The opposed channel members 21 and 22 thereby provide substantially U-shaped guide channels 27 and 28 which are vertically oriented and opened adjacent the uppermost portion 29 and lowermost portion 30 of the opposed channel members. As shown in the drawings, the rear wall members 23 are greater in width than the front wall members and serve to provide greater stability for the mounting bracket as it engages the rear surface 18 of the X-ray cassette.

The back wall members 23 of the channel members are connected adjacent the uppermost portions 29 thereof by an elongated hanger member 32 which is also generally U-shaped in cross section having an elongated upper wall 33, inner wall 34 and outer flange 35. The hanger member is welded or otherwise secured with the inner wall 34 thereof in engagement with the rear walls 33 of the opposed channel members. In this manner, the downwardly extending flange 35 is spaced to the rear of the bracket assembly thereby permitting the hanger member to be engageable over the uppermost wall 39 of an X-ray cassette as shown in FIG. 1. The downwardly extending flange 35 of the hanger member 32 is spaced from the rear walls 23 of the opposed channel members a distance sufficient to permit the bracket assembly to be slidably adjustable generally horizontally with respect to the X-ray cassette during use.

In order to further reinforce the bracket assembly and to retain the ionization chamber frame within the channel members 21 and 22, the lowermost portions 30 of the opposed channel members may be interconnected by elongated frame member 40. It should be noted, as particularly shown in FIGS. 1 and 3, that the lower frame member 40 does not extend into the opposed channel 27 and 28 defined by the channel members 21 and 22, and, therefore, the ionization chamber frame 16 is not obstructed thereby and thus may be vertically adjusted both above and below the bracket assembly.

After the ionization chamber mounting bracket has been mounted to an X-ray cassette, the ionization chamber frame is inserted within the guide channels 27 and 28 and vertically adjusted so that the ionization chamber 15 is brought into proper alignment with an X-ray source 12. The ionization chamber frame is retained in a fixed vertically adjusted position by a pair of opposed locking assemblies 42 and 43, which are disposed through the channel members 21 and 22. The locking members 42 and 43 include rotatable handles 44 which are connected to elongated threaded shafts 45 having a resilient abutment member 46 on the outermost portion thereof. The threaded shafts 45 are rotatably advanced through openings 48 in the opposed guide channels and retained in adjusted position by captive nuts 49. The abutment members 46 serve to engage the side walls of the rectilinear frame member 16 of the ionization chamber frame when the locking means are advanced inwardly toward the frame.

In order to permit the ionization chamber frame 16 to be vertically reoriented with respect to the frame, the locking assemblies 42 and 43 are rotated so as to permit a frictioned sliding movement of the frame members with respect to the bracket member. After the proper vertically adjusted position has been attained, the abutment members of the locking assemblies are brought into a pressing engagement with the ionization chamber frame thereby retaining the same in a locked position.

It can be seen from the foregoing description that the ionization chamber and mounting bracket assembly may easily and readily be mounted to an X-ray cassette so as to be both horizontally and vertically adjustable both with respect to the cassette as well as the X-ray source. The ionization chamber is thus portable and adjustable for use with X-ray cassettes in different environments.

I claim:

1. A combination ionization chamber and support bracket for mounting directly to an X-ray cassette comprising an ionization chamber means having generally parallel spaced side walls, a bracket assembly having a pair of spaced and opposing vertically oriented guide channel means, each of said guide channel means having upper and lower open ends, hanger means attached to said guide channel means adjacent the upper ends thereof for selectively engaging the X-ray cassette, said ionization chamber means being vertically adjustably carried between said guide channel means and being extendable above and below said guide channel means with said side walls of said ionization chamber means being in sliding engagement with said guide channel means, locking means carried by said opposed guide channel means, said locking means being selectively engageable with said ionization chamber means as to retain said ionization chamber means in a fixed adjustable position relative to said guide channel means.

2. The combination of claim 1 in which said hanger means includes an elongated hook means extending between and connecting said upper ends of said guide channel means, said hook means having elongated downwardly extending flanges in horizontally spaced relationship to said guide channel means, said hook means having a generally inverted U-shaped cross section.

3. An apparatus for supporting an ionization chamber directly to an X-ray cassette so as to receive radiation passing therethrough comprising a pair of spaced and opposing vertically oriented guide channel means, each of said guide channel means having elongated and generally parallel front and rear walls connected by an elongated outer side wall, said front, rear and side walls of each of said guide channel means defining a generally U-shaped guide passage, each of said guide channel means having upper and lower open ends, an elongated hanger means connected to and extending between said opposed guide channel means and mounted to said rear walls of each of said guide channel means adjacent the upper ends thereof, said hanger means having an elongated flange disposed in spaced relationship from said rear walls of said guide channel means and extending generally parallel thereto, a reinforcement member extending between and connecting said guide channel means adjacent the lower ends thereof, adjustable locking means carried by each of said guide channel means, each said locking means having abutment means extending inwardly of said U-shaped guide passages, said adjustable locking means allowing said ionization chamber to be selectively vertically adjustably carried between said guide channel means and be extendable above and below said guide channel means while being horizontally adjustably supported from the X-ray cassette by said hanger means.

* * * * *